US011038701B2

(12) United States Patent
May et al.

(10) Patent No.: US 11,038,701 B2
(45) Date of Patent: Jun. 15, 2021

(54) METHOD FOR SECURING AN INTEGRATED CIRCUIT DURING FABRICATION

(71) Applicant: COMMISSARIAT A L'ENERGIE ATOMIQUE ET AUX ENERGIES ALTERNATIVES, Paris (FR)

(72) Inventors: Michael May, Saint Jean de Moirans (FR); Stefan Landis, Tullins (FR); Florian Pebay-Peyroula, Saint-Nizier-du-Moucherotte (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 128 days.

(21) Appl. No.: 16/013,350

(22) Filed: Jun. 20, 2018

(65) Prior Publication Data

US 2018/0375670 A1    Dec. 27, 2018

(30) Foreign Application Priority Data

Jun. 21, 2017    (FR) ...................................... 17 55651

(51) Int. Cl.
*H04L 9/00*    (2006.01)
*H04L 9/32*    (2006.01)
(Continued)

(52) U.S. Cl.
CPC ............ *H04L 9/3278* (2013.01); *G06F 7/588* (2013.01); *G06F 21/44* (2013.01); *G06F 21/72* (2013.01);
(Continued)

(58) Field of Classification Search
CPC .................................................... H04L 9/3278
See application file for complete search history.

(56) References Cited

U.S. PATENT DOCUMENTS 6,621,720 B1 * 9/2003 Devin .................... G11C 16/12
                                                                363/59
8,977,847 B1 * 3/2015 Juels ......................... H04L 9/32
                                                                713/162
(Continued)

FOREIGN PATENT DOCUMENTS

EP        2 819 049 A1    12/2014

OTHER PUBLICATIONS

French Preliminary Search Report dated Nov. 16, 2017 in French Application 17 55651, filed on Jun. 21, 2017 (with English Translation of Categories of cited documents).
(Continued)

*Primary Examiner* — Josnel Jeudy
(74) *Attorney, Agent, or Firm* — Oblon, McClelland, Maier & Neustadt, L.L.P.

(57) ABSTRACT

The invention relates to a method of securing an integrated circuit during its fabrication on a wafer, said method including the following steps:
delimitation of said wafer of the integrated circuit (1) into a first zone called a standard zone (5a) and a second zone called a security zone (5b), and
creation of a random connection tracks network (7b) in said security zone (5b) configured to interconnect a set of conducting nodes (9b) thus forming a physical unclonable function modelled by random electrical continuity that can be queried through said set of conducting nodes using a challenge-response authentication protocol.

12 Claims, 5 Drawing Sheets

(51) Int. Cl.
    *G06F 21/73*       (2013.01)
    *G06F 21/86*       (2013.01)
    *H01L 23/00*       (2006.01)
    *G06F 7/58*        (2006.01)
    *G06F 21/44*       (2013.01)
    *G06F 21/72*       (2013.01)
    *H01L 21/3213*     (2006.01)

(52) U.S. Cl.
    CPC .............. *G06F 21/73* (2013.01); *G06F 21/86* (2013.01); *H01L 23/573* (2013.01); *H01L 23/576* (2013.01); *H01L 21/32139* (2013.01); *H04L 2209/12* (2013.01)

(56) References Cited

U.S. PATENT DOCUMENTS

| | | | | |
|---|---|---|---|---|
| 2010/0275036 | A1* | 10/2010 | Harada | G11B 20/0021 713/189 |
| 2014/0042628 | A1* | 2/2014 | Edelstein | H01L 23/522 257/758 |
| 2015/0084193 | A1 | 3/2015 | Feng et al. | |
| 2015/0207505 | A1* | 7/2015 | Feng | H01L 27/088 257/392 |
| 2015/0269378 | A1* | 9/2015 | Falk | H04L 63/105 726/6 |
| 2016/0105437 | A1* | 4/2016 | Yokoyama | H04L 9/3271 726/4 |
| 2016/0329287 | A1* | 11/2016 | Li | H01L 23/576 |
| 2016/0359636 | A1* | 12/2016 | Kreft | G06F 21/71 |
| 2017/0063821 | A1* | 3/2017 | Chen | G01R 31/2851 |
| 2017/0310688 | A1* | 10/2017 | Lecomte | H04L 9/3278 |
| 2018/0097639 | A1* | 4/2018 | Gulati | G06F 8/61 |
| 2018/0358310 | A1* | 12/2018 | May | H01L 23/57 |

OTHER PUBLICATIONS

Gassend, B., et al. "Silicon Physical Random Functions", Massachusetts Institute of Technology, Proceedings of the Computer and Communication Security Conference, Nov. 2002, Computation Structures Group, Memo 456, 14 pages.

Kumar, S., et al. "Extended Abstract: The Butterfly PUF Protecting IP on every FPGA", Workshop on Cryptographic Hardware and Embedded Systems (CHES), Sep. 2007, Vienna, 4 pages.

Helinski. R., et al. "A Physical Unclonable Function Defined Using Power Distribution System Equivalent Resistance Variations", DAC'09, 6 pages.

* cited by examiner

METHOD FOR SECURING AN INTEGRATED CIRCUIT DURING FABRICATION

TECHNICAL DOMAIN

This invention relates to the domain of securing integrated circuits, particular constructively, using physical unclonable functions.

STATE OF PRIOR ART

Counterfeiting of integrated circuits is now a major problem for manufacturers and users. Attempts are being made to resist this counterfeiting by finding means of discriminating between a legitimate circuit and a counterfeit circuit.

A first solution would consist of attributing a unique identifier for each integrated circuit and constructing a database of legitimate identifiers. This solution is not very viable because it is fairly simple to emulate (or replay) a valid identifier using a hardware or software lock.

A more efficient solution consists of using a challenge-response mechanism to make an authentication while protecting against attack by emulation (replay). This technique is based on the use of a function to calculate the response from the challenge. The function must be unique for each integrated circuit and must be unclonable. It must be impossible for an attacker to physically recreate or to clone such a function. This type of function is called a PUF (Physical Unclonable Function).

Prior art includes integrated circuits containing different sorts of PUFs making use of functional dispersions inherent to the circuits.

A first PUF technique makes use of the variability induced on signal propagation times at the limits of electronic constraints of the circuit. A first example is an integrated circuit comprising an arbitrator PUF consisting of inserting electrical signals at the input to a long path of combination circuits and detecting the fastest signal. A path is set up in the circuit between the different signals that propagate along different combination paths and the signal that arrives first is detected by the arbitrator. The electrical input signals define the challenge and the first detected signal defines the response.

Another example is the ring oscillator PUF described in the document by Gassend et al. entitled "Silicon Random Functions"; *proceedings of the Computer and Communications Security Conference*, November 2002. This PUF is composed of several delay loops oscillating at specific frequencies and that control counters. The loops are arranged identically but inherent technological dispersions lead to loops with slightly different frequencies. Thus, counters controlled by loops are used to produce response bits to a challenge.

A second PUF technique makes use of instabilities on startup. For example, SRAM memories, already present in most circuits, can be used as PUFs. The basic principle is to recover the state of the memory during startup, that is normally unique. On the same principle, the PUF can be implemented by butterfly circuits made from matrices of two cross locks in which the state of the memory cell during start up is undetermined. This technique is described in the document by Kumar et al. entitled "The Butterfly PUF: Protecting IP on every FPGA"; *Workshop on Cryptographic Hardware and Embedded Systems (CHES)*, September 2007, Vienna. Similarly, there are also bistable ring circuits composed of an odd number of inverters and thus also having an undetermined state on start up.

A third PUF technique makes use of technological dispersions of resistances in a circuit. Such a technique is described in the document by R Helinski et al. entitled "A Physical Unclonable Function Defined Using Power Distribution System Equivalent Resistance Variations"; *DAC* 2009. More particularly, the authors propose to measure the voltage drop in an integrated circuit between the power supply planes and ground planes due to technological dispersions of resistances defined by conducting tracks and interconnections of the circuit. The voltage drop is proportional to the current measured in short circuited inverters arranged over the entire surface of the circuit.

However, all PUFs described above are based on operations at the limits of electronic constraints of circuits and consequently are very sensitive to environmental variations. In particular, changes to temperatures, power supply voltages or electromagnetic interference can affect their performance by reducing their robustness and increasing their volatility (i.e. their intra-circuit variability). Thus, for a constant challenge, the PUF can return different results depending on environmental conditions implying that a legitimate circuit could possibly be declared as being counterfeit.

Another problem relates to ageing of the integrated circuit. Due to operation at the limits of electronic constraints, the smallest defect that occurs during ageing of the circuit makes the PUF respond differently and consequently makes it impossible to identify the integrated circuit.

To overcome these defects, a received response post-processing circuit often has to be attached to the PUF, and this is expensive in terms of footprint and consumption.

The purpose of this invention is to disclose a method of securing an integrated circuit correcting the above-mentioned disadvantages, in particular by making a PUF that is almost insensitive to variations in environmental conditions without the addition of an expensive post-processing circuit and without making any significant modifications to the method of fabricating the circuit.

PRESENTATION OF THE INVENTION

This purpose is achieved with a method of securing an integrated circuit during its fabrication on a wafer, said method including the following steps:
  delimitation of said wafer of the integrated circuit into a first zone called a standard zone and a second zone called a security zone, and
  creation of a random connection tracks network in said security zone by the controlled introduction of a phase separation material, said random connection tracks network being configured to interconnect a set of conducting nodes thus forming a physical unclonable function modelled by random electrical continuity that can be queried through said set of conducting nodes using a challenge-response authentication protocol, the conducting nodes being quasi-point nodes. These quasi-point nodes form intermediaries between the base conducting tracks and the random connection tracks network.

This can identify and secure the integrated circuit in a robust manner remaining insensitive to variations in environmental conditions. Unlike prior art, this method does not used uncontrolled methods in the electrical operation of the circuit, but rather in the fabrication method itself. Moreover, the point conducting nodes limit short circuits between base conducting tracks and random connection tracks, enabling optimum operation of the randomness fabricated by the phase separation material.

Advantageously, said random connection tracks network is created when the circuit is fabricated by a transfer of a pattern of links made at random by a phase separation between at least two components of a block copolymer. Advantageously, the masks used to fabricate the circuits are identical, variability on the random tracks network being added during fabrication.

Thus, the method uses uncontrolled and random means in the hardware fabrication of the interconnection structure.

Advantageously, a first sub-set of conducting nodes is configured to receive a challenge, while a second complementary sub-set of conducting nodes is configured to provide the response to said challenge.

This makes a very secure authentication possible that is protected against replay attacks.

According to a first embodiment, said first and second sub-sets of conducting nodes are formed on the same contact level.

According to a second embodiment, said first sub-set of conducting nodes is formed on a first contact level while said second sub-set of conducting nodes is formed on a second contact level.

According to a first preferred embodiment of this invention, the security of the integrated circuit is integrated when fabricating a back-end of said integrated circuit and comprises the following steps:
make a first contact level on the surface of said standard and security zones of said integrated circuit wafer,
deposit a first multilayer on the surface of said first contact level, comprising a barrier to metallic diffusion and an etching mask,
deposit at least one second layer including said block copolymer on said first multi-layer,
thermal annealing of the wafer leading to laminar auto-arrangement of said copolymer block,
insolation of said security zone making one of the two components of said block copolymer soluble,
application of an appropriate solution for removing said soluble component from said copolymer by dissolution leaving only the pattern of links formed by a single phase of said block copolymer in place in said security zone,
transfer said links pattern from said security zone in the etching mask, thus forming etching of corresponding links,
strip the surface of the standard and security zones,
continue the normal fabrication procedure to create etchings in the circuit to be formed in the standard zone, and
fill etchings in the standard and security zones with a conducting metal.

Thus, the random part is in the fabrication method and not in the different masks or etchings. Furthermore, all the successive steps are regulated and controlled to assure extremely low variability of key functional parameters of integrated circuits. Furthermore, since the fabrication of the random connection tracks network is not controlled, the cost of cloning becomes excessively high and reverse engineering by imagery or by learning is extremely difficult.

Advantageously, the method also comprises fabrication of a second contact level on the surface of the standard and security zones.

This can increase the number of logical challenge-response inputs-outputs, further securing the authentication protocol.

According to one particular embodiment of this invention, said block copolymer is composed of a first polystyrene (PS) type homopolymer and a second polymethyl methacrylate (PMMA) type homopolymer.

Thus, the two homopolymers have different physico-chemical properties so that they can be separated in a controlled manner.

Advantageously, said at least one second layer comprises a first intermediate etching mask layer of the "Spin On Carbon" SOC type and a second intermediate "Silicon Anti Reflective Coating" SiARC layer.

This can increase the transfer capacity to make very small patterns of the order of a few tens of nanometres.

Advantageously, the method includes an application of a voltage higher than the read voltage to break down fragile connection tracks.

This can eliminate fragile contacts and thus eliminate almost all variation by ageing.

According to another embodiment of this invention, the integrated circuit is secured at the front-end.

The invention also relates to a secured integrated circuit that can be obtained using a method according to the invention.

BRIEF DESCRIPTION OF THE DRAWINGS

This invention will be better understood after reading the description of example embodiments given purely for information and that are in no way limitative, with reference to the appended drawings on which.

DETAILED PRESENTATION OF PARTICULAR EMBODIMENTS

The basic concept of the invention is deliberate and random creation of a network of metallic connection links during fabrication of the integrated circuit by the controlled introduction of a phase separation material.

Figure 1:
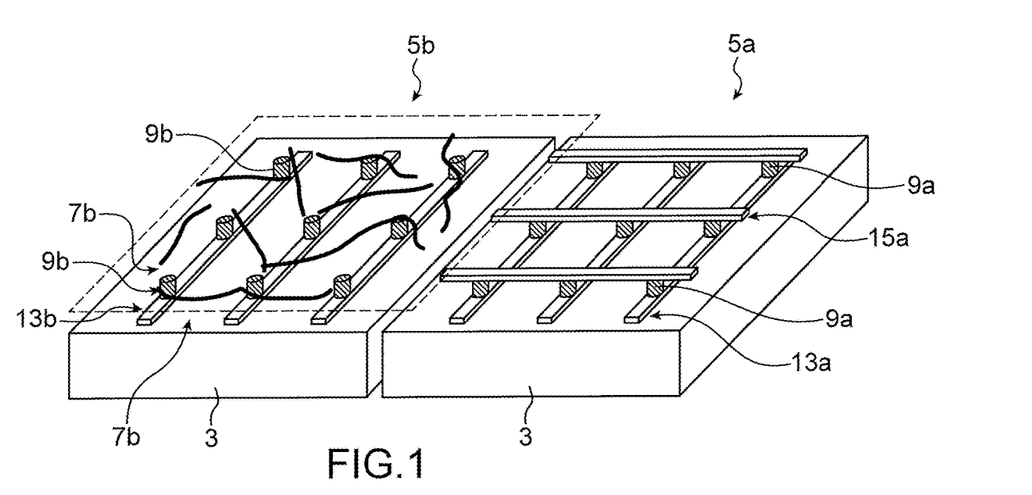
FIG. 1 very diagrammatically illustrates a method of securing an integrated circuit, according to one embodiment of the invention.

FIG. 1 very diagrammatically illustrates a method of securing an integrated circuit, according to one embodiment of the invention.

The securing method according to the invention is perfectly integrated into the actual fabrication method of the integrated circuit 1 on a silicon wafer 3. In the fabrication method, the patterns on the silicon wafer 3 are created using a photo-repetition method making each integrated circuit identical to the others. All the successive steps are regulated and controlled to assure extremely low variability of functional parameters of integrated circuits. However, the fabrication method includes intrinsically random physical implementation steps that introduce discernible characteristics that assure that each integrated circuit 1 is unique, without modifying their initial functional parameters.

During normal fabrication of the integrated circuit 1 (or electronic chip), the securing method includes delimitation of the integrated circuit 1 into a first surface zone called the standard zone 5a and a second surface zone called the security zone 5b. The standard zone 5a is the functional part of the integrated circuit 1. This zone is occupied by basic electronic components adapted to perform particular functions of the circuit. On the other hand, the security zone 5b is occupied by a physical unclonable function PUF intended to secure the basic circuit.

More particularly, during fabrication of the integrated circuit, the securing method includes creation of a random connection tracks network 7b in the security zone 5b by a controlled introduction of a phase separation material. The random connection tracks network 7b is configured to randomly interconnect a set of conducting nodes 9b. It will be noted that these conducting nodes 9b are like their equivalent conducting nodes in the standard zone 5a placed in a determined and random manner. Furthermore, the random connection tracks network 7b is in a plane (in dashed lines) that is at the same level as the plane of the conducting tracks 15a in the standard zone 5a. In the standard zone 5a, the conducting nodes 9a interconnect two standard conducting track levels 13a, 15a while in the security zone 5b the conducting nodes 9b connect a base conducting tracks level 13b to links from the random connection tracks network 7b.

The random connection tracks network 7b in the security zone 5b is thus modelled by a random electrical continuity that can be queried through the set of conducting nodes 9b by a challenge-response authentication protocol.

We note that the conducting nodes 9b are quasi-point nodes that form intermediaries between the base conducting tracks 13b and the random connection tracks network 7b. These quasi-point nodes 9b limit short circuits between the base conducting tracks 13b and the random connection tracks 7b. This gives a very fine grain size and therefore optimum operation of the uncertainty fabricated by the phase separation material.

Figure 4A:
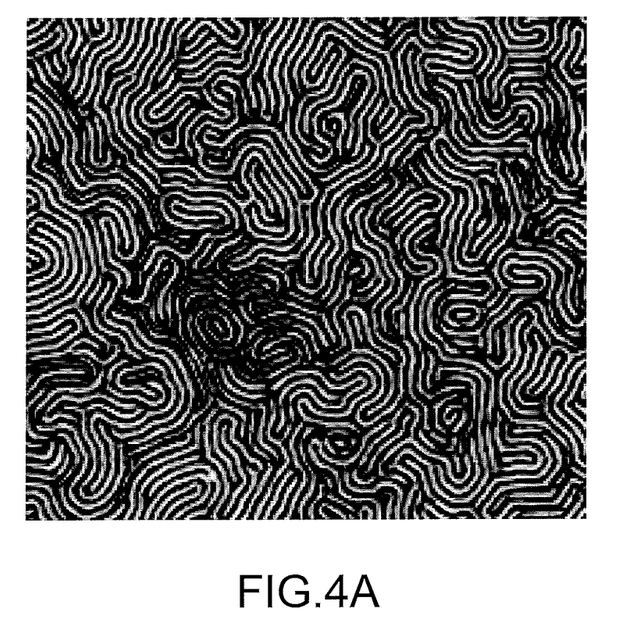
FIG. 4A illustrates an example of a non-homogeneous layer of a PS-PMMA type block copolymer according to the invention.

Advantageously, the random connection tracks network 7b of the security zone 5b is created by a transfer of a pattern of links made at random by a phase separation between at least two components of a copolymer with a heterogeneous structure and more particularly a block copolymer (see FIG. 4A). This creation of the random connection tracks network 7b is based on auto-arrangement properties of the heterogeneous structure copolymer.

Advantageously, the block copolymer used is composed of a first polystyrene (PS) type homopolymer grafted to a second polymethyl methacrylate (PMMA) type homopolymer. The arrangement scheme of the PS-PMMA block copolymer depends on the mass or molar proportion of one block relative to the other. In particular, it is known that in the case in which the relative fraction of a block is about 50% by volume, a pattern can be obtained composed of lines of PS interlaced in lines of PMMA. The PS-PMMA block polymer is advantageously usable in a clean room. This block copolymer is currently used in the microelectronic components fabrication environment. More particularly, complex methods are used to create perfectly parallel lines starting from block copolymers so as to fabricate microelectronic components. For example, such a method is described in the document by Cheng et al, ACS Nano, Vol. 4, No. 8, 4815-4823, 2010 IBM Almaden Research Center. The purpose of prior art is thus to correct the irregularity due to disorder inherent to random auto-arrangement of block copolymers to control the fabrication of straight lines.

On the other hand, the method according to this invention transforms the irregularity of prior art into an advantage in a non-obvious manner, by using the auto-arrangement property of block copolymers to simply create a random connection tracks network to model a PUF.

According to one embodiment of the invention, after delimitation of the wafer of the integrated circuit 1 into a standard zone 5a and a security zone 5b, the surface of the wafer 3 to be structured with the block copolymer is prepared by deposition of a so-called neutral layer. This neutral layer is prepared as a function of the nature of constituents of the block copolymer. The neutral layer has the same affinity for the two components, PS and PMMA, to obtain an arrangement perpendicular to the surface of the interlaced PS and PMMA layers. For example, the neutral layer is a statistical copolymer of PS and PMMA (i.e. instead of having a block of PS and a block of PMMA, the two components of the statistical copolymer are chained in a random manner).

The block copolymer is firstly diluted in a solvent to form a solution with a concentration equal to a few percent by mass before being deposited by centrifuging on the neutral layer of the wafer 3. For example, the concentration of the block copolymer solution is between about 1% and 5% by mass. A first annealing is then done for a few minutes at a temperature of 10 to 30 degrees above the vitreous transition temperature of the block copolymer to facilitate evaporation of residual solvent in the deposited layer.

An arrangement annealing is then done to separate phases between the two copolymer blocks. The compounds of the block copolymer are arranged under the effect of thermal annealing into a network of lines and spaces with a period $L_0$, thus defining constant line length and spacing. The value of the period $L_0$ is determined by the length of molecular chains of blocks forming the copolymer. This period $L_0$ is typically between 20 nm and 100 nm, so that lines with a length between 10 nm and 50 nm can be created. For example in the case of a PS-PMMA type block copolymer, a period $L_0$ of the order of 40 nm can be obtained for a resin film thickness between about 30 nm and 60 nm by annealing at a temperature of the order of 200° C. to 240° C. for a duration of 5 to 10 minutes.

An insolation and development step of patterns formed by one of the two blocks is then made in the security zone 5b so as to only keep one block on its surface to be textured. The result thus obtained on this surface of the security zone 5b is a resin pattern that can subsequently be transferred by dry etching so as to create the random connection tracks network 7b.

Finally, a stripping step is performed to clean remaining polymer residues from the surface of the security zone 5b and the surface of the standard zone 5a before continuing the usual fabrication procedure of the integrated circuit 1.

Figure 2:
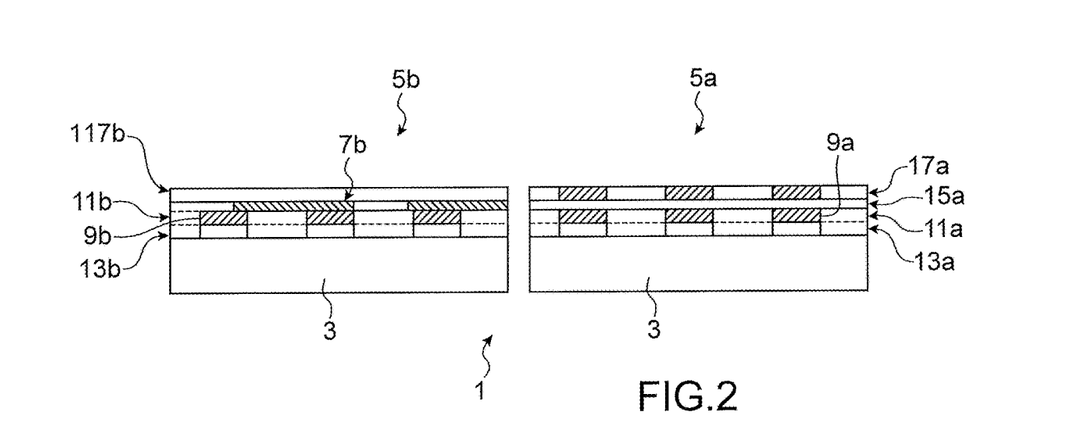
FIG. 2 very diagrammatically illustrates a sectional view of an integrated circuit made using the security method according to one embodiment of the invention.

FIG. 2 very diagrammatically illustrates a sectional view of an integrated circuit made using the security method according to one embodiment of the invention.

The secured integrated circuit (or secured electronic chip) thus comprises a standard zone 5a and a security zone 5b. The standard zone 5a normally comprises at least one contact level 11a including conducting nodes 9a interconnecting at least two standard levels of conducting tracks 13a, 15a to different electronic components (not shown) of the integrated circuit 1 (see also FIG. 1). More particularly, the example in FIG. 2 shows a first contact level 11a (or lower contact level) and a second contact level 17a (or higher contact level) in the standard zone 5a.

The security zone 5b comprises a random connection tracks network 7b coupled to at least one contact level 11b including a set of conducting nodes 9b adapted to test the electrical continuity of this random connection tracks network 7b. The example in FIG. 2 shows that the security zone 5b comprises a base conducting tracks level 13b and a single contact level 11b including conducting nodes 9b connecting the links of the random connection tracks network 7b. According to this example, the upper level 117b is a complete layer (for example SiN) that contains no conducting nodes. It will be noted that the security zone 5b may advantageously comprise a plurality of random connection track networks and a plurality of corresponding contact levels so that the complexity of the PUF can thus be increased.

The random connection tracks network(s) 7b model(s) electrical continuity between the different conducting nodes 9b through which a challenge-response authentication protocol can be applied. More particularly, a first sub-set of conducting nodes is configured to receive a stimulus defining a challenge, while a second complementary sub-set of conducting nodes is configured to provide an output signal corresponding to the response to said challenge. The response is thus dependent on the electrical continuity of the random interconnection tracks network 7b specific to the electronic chip 1 and to the challenge used. The conducting nodes 9b receiving the stimulus define a security input to the integrated circuit 1 (more precisely the random connection tracks network 7b and consequently the PUF) while those that supply the response form the security output from the integrated circuit.

It will be noted that in the case in which there is only one contact level, the first and the second sub-sets of conducting nodes 9b are obviously formed on the same contact level 11b. On the other hand, when there are two contact levels 11b, 17b (see FIG. 3K), the first sub-set of conducting nodes may be formed on a first contact level (or lower contact level) 11b while the second sub-set of conducting nodes can be formed on a second contact level (or higher contact level) 17b or vice-versa. As a variant, the first and second sub-sets of conducting nodes can invariably be formed in a complementary manner on the first and second contact levels. In all cases, the conducting nodes 9b selected to form the input or the output of the PUF are predetermined according to the specifications in the authentication protocol.

The securing zone 5b of each integrated circuit 1 derived from the securing method thus has a unique connection tracks network 7b for which the fabrication process is random and uncontrolled and consequently extremely difficult to clone.

After the production of secure integrated circuits, an enrolment phase is performed that consists of constructing a database containing legitimate "challenge-response" pairs for each integrated circuit 1. Specifically, for each integrated circuit 1, a tester randomly generates a given number N of challenges C and addresses them to the integrated circuit 1. Each challenge C is composed of a stimulus applied to the security input of the integrated circuit 1 and the response R to each challenge C is recovered at the security output from the integrated circuit 1. The PUF that defines a secret function F (materialised by the random connection tracks network 7b) calculates the response R to each challenge C (i.e. R=F(C)). The tester recovers the N responses R associated with the N challenges C and stores the N corresponding challenge-response (C, R) pairs in a database (not shown).

Thus, authentication of a secure integrated circuit 1 can be tested throughout its life cycle. More particularly, a user of an integrated circuit 1 can ask the manufacturer (or the entity that has the database of challenge-response pairs) for a challenge (or a challenge-response pair). The challenge C is applied to the integrated circuit 1 and this integrated circuit calculates the response to the challenge C. The user (or the manufacturer) compares the response generated by the integrated circuit 1 with the response stored in the database to verify the legitimacy of the integrated circuit 1. It will be noted that a used challenge-response is then deleted from the database to prevent replays, to further increase security.

FIGS. 3A-3K very diagrammatically illustrate steps in a method of securing an integrated circuit according to one preferred embodiment of the invention.

Figure 3A:
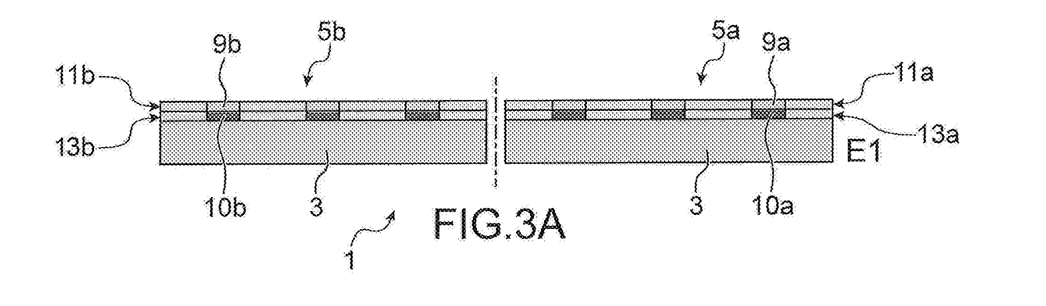
FIGS. 3A-3K very diagrammatically illustrate steps in a method of securing an integrated circuit according to one preferred embodiment of the invention.
Figure 3B:
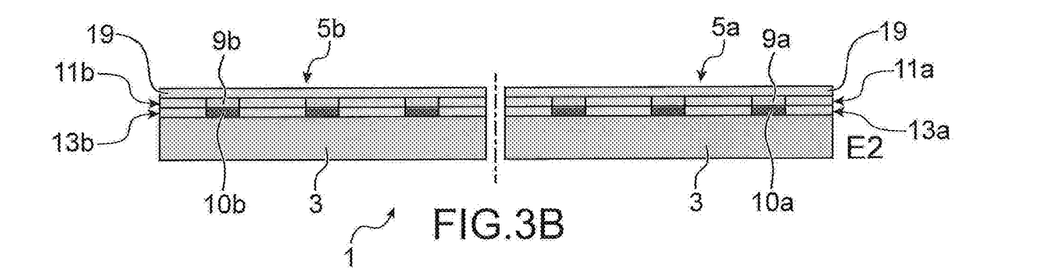

In a manner known to an expert in the subject, it is considered that the integrated circuit 1 on the standard zone 5a was previously fabricated according to the usual steps of preparation of an oxide layer on a substrate, transfer of the design of the circuit to be reproduced using a mask, etching, doping, fabrication of subsequent layers, etc.

Thus, the starting point is a wafer 3 delimited into a security zone 5b and a standard zone 5a on which the entire "front-end" fabrication process was done, in other words on which practically the entire circuit to be secured was fabricated.

According to this embodiment, securing the integrated circuit 1 then begins at the end of the front-end and is integrated into the steps to fabricate semiconductor components at the "back-end", in other words when making the first electrical interconnections to interconnect components to each other appropriately and with input-output electrodes.

FIG. 3A very diagrammatically illustrates a first step in the securing method.

The first step E1 (FIG. 3A) consists of making a first contact level 11a, 11b on the surface of the standard zone 5a and the security zone 5b of the wafer 3 of the integrated circuit 1. This first contact layer comprises interconnection holes filled with a conductor made of copper, aluminium or another electricity-conducting metal or material thus forming a set of conducting nodes 9a, 9b. The conducting nodes are in contact with a previously made lower line of conducting tracks 10a, 10b (made of copper, aluminium or other). It will be noted that this step can be considered as an initial step done at the "back-end" of the method of fabricating the integrated circuit.

The second step E2 (FIG. 3B) consists of depositing a first multi-layer 19 on the surface of the first contact level 11a, 11b. The first multi-layer 19 comprises a barrier to metallic diffusion and a hard etching mask. This first multi-layer 19 may for example be a bilayer composed of an SiN layer having the barrier function and an $SiO_2$ layer with the etching mask function.

The third step E3 (FIG. 3C) consists of depositing at least one second layer 21 including the block copolymer. For example, a PS-PMMA type block copolymer is used that auto-arranges into lines of PS interlaced in lines of PMMA.

Figure 3C:
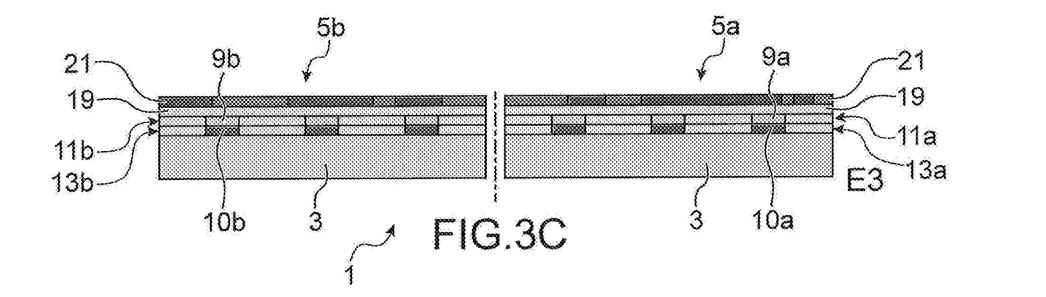
Figure 3D:
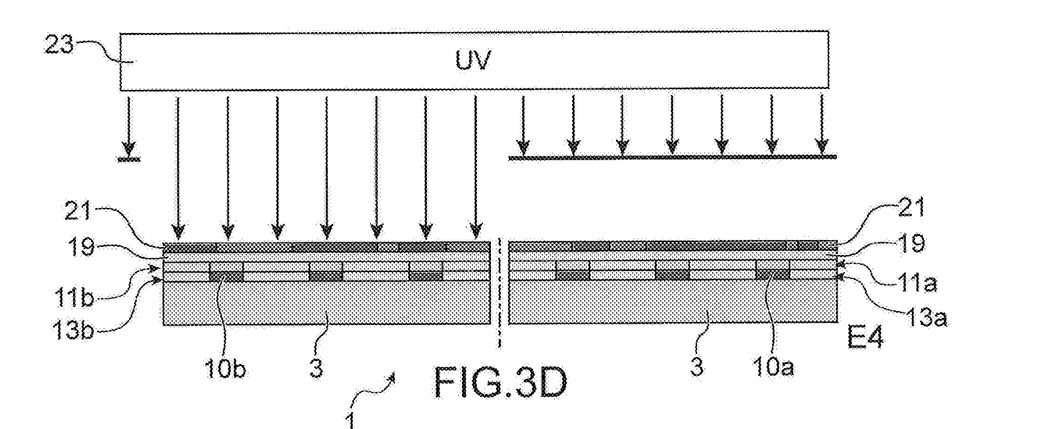
Figure 3E:
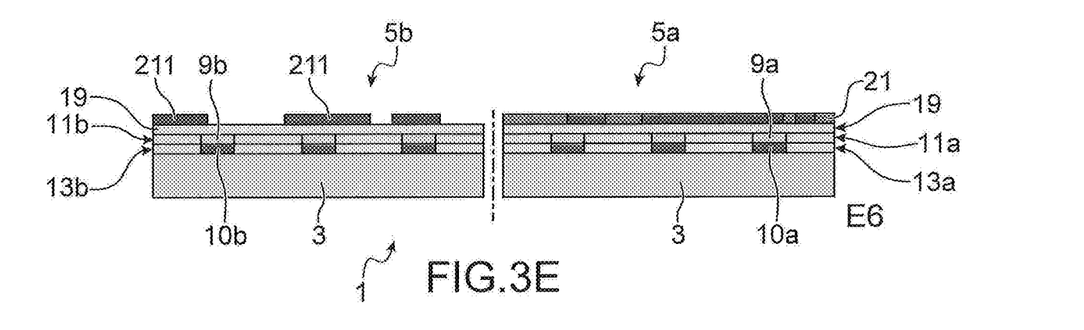
Figure 3F:
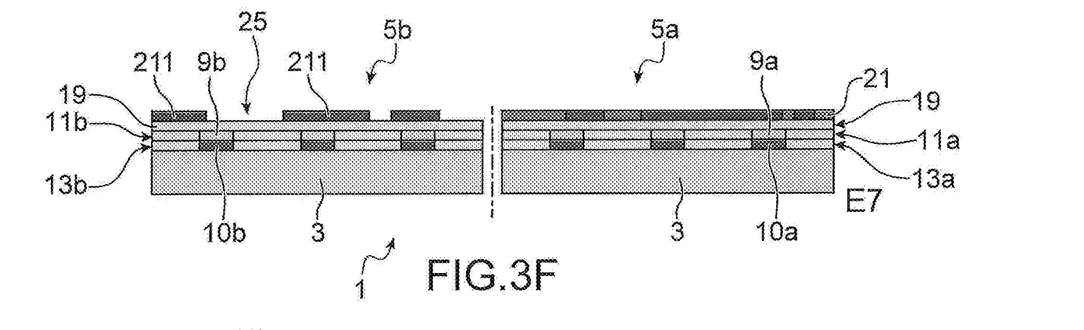
Figure 3G:
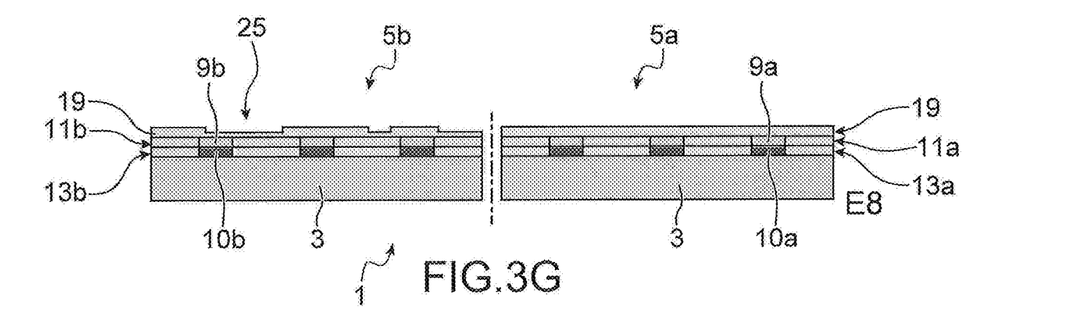
Figure 3H:
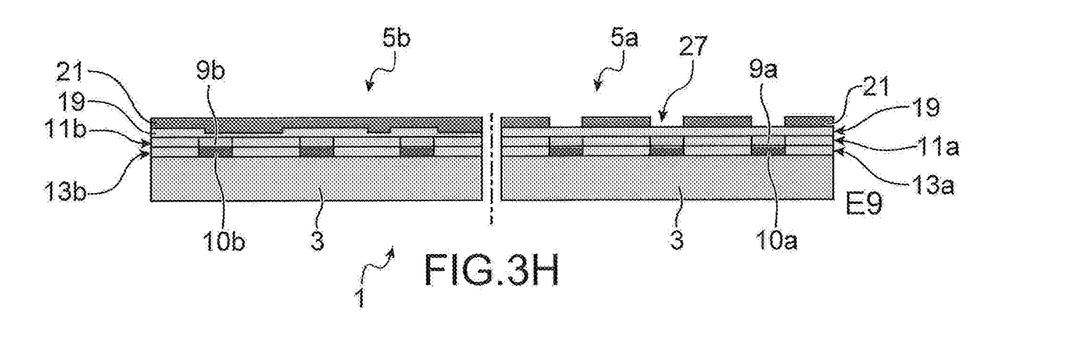
Figure 3I:
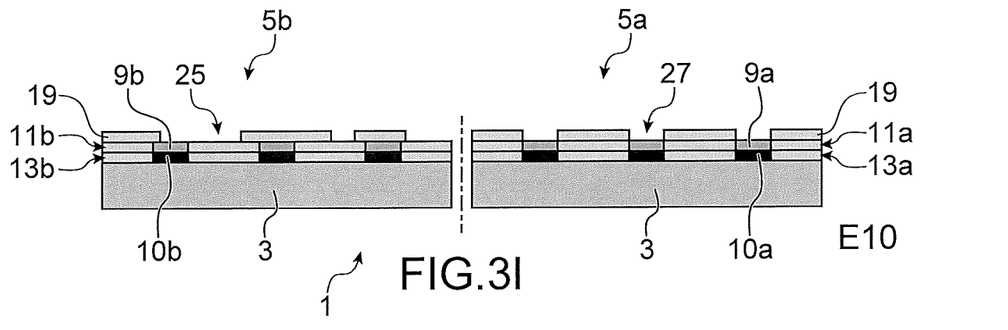
Figure 3J:
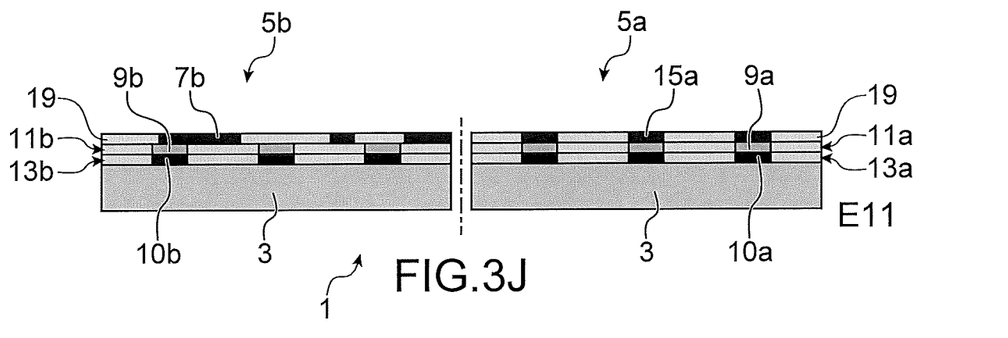

Advantageously, said at least one second layer 21 is a stack of layers that can be deposited using the method known as spin coating. Thus, a first intermediate etching mask of the SOC (Spin On Carbon) type is deposited, followed by a second SiARC (Silicon Anti Reflective Coating) intermediate layer and the block copolymer layer in solution with for example a concentration of between about 1% and 5% by mass.

The thicknesses of these three layers can vary depending on the nature of the products used and the dimensions of the conducting lines and tracks. They are typically of the order of 150 nm for SOC, of the order of 30 nm for SiARC and of the order of 80 nm for the heterogeneous structured copolymer. It will be noted that the intermediate etching mask and coating layers can be used to make very small patterns of the order of a few tens of nanometres.

The fourth step E4 consists of a thermal annealing of the wafer 3 causing a laminar auto-arrangement of the heterogeneous structured copolymer into a network of lines and spaces with a period predetermined by the length of molecular chains forming the blocks. The energy input by thermal annealing separates the two phases. An example of a non-homogeneous layer of the PS-PMMA block copolymer is illustrated on FIG. 4A. In particular, this example illustrates the laminar auto-arrangement of the PS-PMMA block copolymer into two phases represented by light and dark chains that push each other.

It will also be noted that the separation between the two phases can be made chemically using a solvent instead of thermal annealing.

The fifth step E5 (FIG. 3D) consists of using a classical lithography tool 23 to insolate only the security zone 5b so as to make one of the two components of the block copolymer soluble. For a PS-PMMA type block copolymer, the insolation chemically modifies the PMMA blocks generating a split in the PMMA chains making them soluble in an appropriate solvent for example such as acetic acid or isopropanol.

Figure 4B:
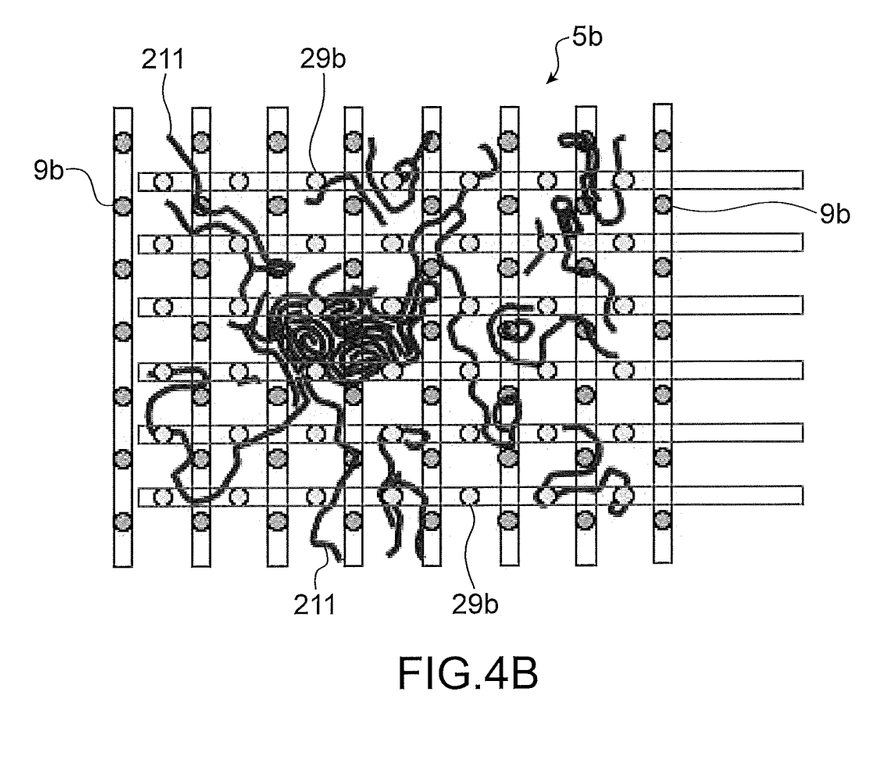
FIG. 4B illustrates links formed by a single phase of the block copolymer according to the invention.

The sixth step E6 (FIG. 3E) consists of applying an appropriate solution for removing the soluble component of the copolymer by dissolution leaving only the pattern of links 211 formed by a single phase of the block copolymer in place in the security zone 5b. More particularly, for the PS-PMMA block copolymer, the development of patterns in the solvent makes it possible to leave only the PS blocks in place. FIG. 4B illustrates links 211 formed by a single phase of the block copolymer. On the other hand, in the standard zone 5a, the entire layer 21 of the PS-PMMA block copolymer is kept because no isolation is made in this zone.

The seventh step (FIG. 3F) consists of transferring the links pattern 211 from said security zone 5b into the etching mask, thus forming etchings 25 of corresponding links. In particular, lines of PS are transferred into the etching mask (i.e. first the SiARC and then the SOC and then the $SiO_2$). It will be noted that the etching operation is done selectively in the security zone 5b leaving the standard zone 5a protected.

The eighth step E8 (FIG. 3G) consists of stripping the surface of the standard zone 5a and the security zone 5b, removing both residual resin and the SOC/SiARC etching masks.

In the ninth step E9 (FIG. 3H), the normal fabrication procedure is resumed to create etchings of the circuit as initially designed in the standard zone 5a. In particular, lithography is done on a level of lines 27 for the standard zone 5a, followed by the transfer etching in the hard mask and stripping of the resin.

The tenth step E10 (FIG. 3I) consists of transferring etchings of links 25 of the security zone 5b and the lines 27 of the standard zone 5a into the etching mask, followed by etching of the SiN copper barrier.

The eleventh step E11 (FIG. 3J) consists of filling etchings of links 25 in the security zone 5b and etchings of lines 27 in the standard zone 5a by a conducting metal (for example copper or aluminium). Thus, the random connection tracks network 7b is formed in the security zone 5b, on the one hand, and a standard conducting tracks network 15a is formed in the standard zone 5a on the other hand. Filling can be done selectively so as to avoid filling the smallest etchings of links in the security zone 5b.

Figure 3K:
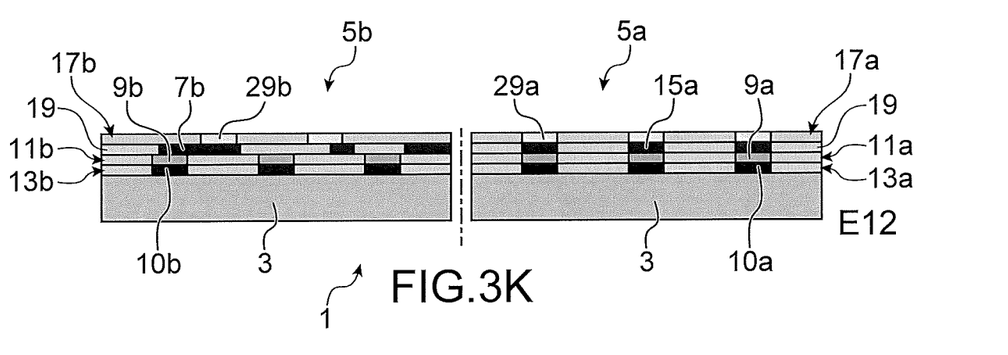

According to another embodiment, the method may comprise fabrication of a second contact level on the surface of the standard zone 5a and the security zone 5b. It will be noted that the second contact level can only be made on the standard zone 5a.

In this case, an additional step E12 is made as illustrated on FIG. 3K. In step E12 (FIG. 3K), an upper contact level 17a, 17b is made containing upper interconnection nodes 29a, 29b in the standard zone 5a and in the security zone 5b. The integrated circuit then comprises first and second (or lower and upper) contact levels including lower 10a, 10b and upper 29a, 29b interconnection nodes.

Advantageously, the upper interconnection nodes 29b in the security zone 5b are offset, for example by half a period, from the lower interconnection nodes 10b (i.e. the first contact level). This spatial offset means that the upper interconnection nodes 29b can be at a different electrical potential from the lower interconnection nodes 10b. Furthermore, the dimensions of the interconnection nodes in the security zone 5b that are very much smaller than those in the standard zone 5a are eliminated by an electrical treatment to prevent any variation by ageing and to increase the reliability of the PUF. More particularly, a voltage is applied exceeding the read voltage to cause failure of very fine interconnections for which the resistivity is too high. Furthermore, the authenticity of an integrated circuit 1 can be tested by presenting a challenge signal to it with a very low current that preserves the identity of the circuit throughout its life cycle.

Methods according to the different embodiments of the invention show that all the successive steps are regulated and controlled to give an extremely low variability of key functional parameters of the circuit in the standard zone 5a while, by construction, allowing uncontrolled fabrication of the random connection tracks network 7b in the security zone 5b. This reinforces the uniqueness of each electronic chip 1, so that it can be identified very precisely, while making cloning extremely difficult.

It will be noted that the embodiment of the securing method according to FIGS. 3A-3K can be transposed to the "Front End", in other words during the fabrication of logic circuits.

The invention claimed is:
1. A method of securing an integrated circuit during its fabrication on a wafer, said method including the following steps:
   delimiting said wafer of the integrated circuit into a first zone called a standard zone and a second zone called a security zone, and
   creating a random connection tracks network in said security zone by the controlled introduction of a phase separation material, said random connection tracks network being configured to interconnect a set of conducting nodes thus forming a physical unclonable function modelled by random electrical continuity, said random electrical continuity being configured to receive a challenge from a challenge-response authentication protocol and to provide an output signal in response to said challenge, the conducting nodes being quasi-point nodes forming intermediaries between base conducting tracks and the random connection tracks network, and wherein said output signal is specific to the integrated circuit and to the challenge.

2. The method according to claim 1, wherein said random connection tracks network is created by a transfer of a pattern of links made at random by a phase separation between at least two components of a block copolymer.

3. The method according to claim 1, wherein a first sub-set of conducting nodes is configured to receive a challenge, while a second complementary sub-set of conducting nodes is configured to provide the response to said challenge.

4. The method according to claim 3, wherein said first and second sub-sets of conducting nodes are formed on the same contact level.

5. The method according to claim 3, wherein said first sub-set of conducting nodes is formed on a first contact level while said second sub-set of conducting nodes is formed on a second contact level.

6. The method according to claim 2, wherein the security of the integrated circuit is integrated when fabricating a back-end of said integrated circuit and comprises the following steps:
    making a first contact level on the surface of said standard zone and security zone of said integrated circuit wafer,
    depositing a first multilayer on the surface of said first contact level, comprising a barrier to metallic diffusion and an etching mask,
    depositing at least one second layer including said block copolymer on said first multi-layer,
    thermally annealing the wafer leading to laminar auto-arrangement of said copolymer block,
    insolating said security zone making one of the two components of said block copolymer soluble,
    applying an appropriate solution for removing said soluble component from said copolymer by dissolution leaving only the pattern of links formed by a single phase of said block copolymer in place in said security zone,
    transferring said links pattern from said security zone in the etching mask, thus forming etchings of corresponding links,
    stripping the surface of the standard zone and the security zone,
    continuing a normal fabrication procedure to create etchings in the circuit to be formed in the standard zone, and
    filling etchings in the standard zone and the security zone with a conducting metal.

7. The method according to claim 6, further comprising fabricating a second contact level on the surface of the standard zone and the security zone.

8. The method according to claim 2, wherein said block copolymer is composed of a first polystyrene (PS) type homopolymer and a second polymethyl methacrylate (PMMA) type homopolymer.

9. The method according to claim 2, wherein said at least one second layer comprises a first intermediate etching mask layer of the "Spin On Carbon" SOC type and a second intermediate "Silicon Anti Reflective Coating" SiARC layer.

10. The method according to claim 1, further comprising applying a voltage higher than the read voltage to break down fragile connection tracks.

11. The method according to claim 1, wherein the integrated circuit is secured at the front-end.

12. An integrated circuit, comprising:
    a standard zone and a security zone,
    base conducting tracks,
    conducting nodes, and
    a random connection tracks network in said security zone, said random connection tracks network being configured to interconnect a set of the conducting nodes thus forming a physical unclonable function modelled by random electrical continuity, said random electrical continuity being configured to receive a challenge from a challenge-response authentication protocol and to provide an output signal in response to said challenge, the conducting nodes being quasi-point nodes forming intermediaries between the base conducting tracks and the random connection tracks network, and wherein said output signal is specific to the integrated circuit and to the challenge.

* * * * *